United States Patent
Matsumoto et al.

(10) Patent No.: US 8,264,124 B2
(45) Date of Patent: Sep. 11, 2012

(54) ULTRASONIC TRANSDUCER

(75) Inventors: Taku Matsumoto, Nagaokakyo (JP); Masatoshi Kajiwara, Nagaokakyo (JP)

(73) Assignee: Murata Manufacturing Co., Ltd., Nagaokakyo-Shi, Kyoto-fu (JP)

( * ) Notice: Subject to any disclaimer, the term of this patent is extended or adjusted under 35 U.S.C. 154(b) by 0 days.

(21) Appl. No.: 13/116,445

(22) Filed: May 26, 2011

(65) Prior Publication Data

US 2011/0221304 A1   Sep. 15, 2011

Related U.S. Application Data

(63) Continuation of application No. PCT/JP2009/070425, filed on Dec. 4, 2009.

(30) Foreign Application Priority Data

Dec. 4, 2008   (JP) .................................. 2008-310321

(51) Int. Cl.
    *H01L 41/053*   (2006.01)
(52) U.S. Cl. .......................... 310/326; 310/327; 310/348
(58) Field of Classification Search .......... 310/326–328, 310/348
    See application file for complete search history.

(56) References Cited

U.S. PATENT DOCUMENTS

| | | | | |
|---|---|---|---|---|
| 3,786,202 | A | * | 1/1974 | Schafft ........................... 310/324 |
| 4,430,529 | A | * | 2/1984 | Nakagawa et al. ............ 381/190 |
| 7,190,105 | B2 | * | 3/2007 | Deserno et al. ................ 310/322 |

FOREIGN PATENT DOCUMENTS

| | | |
|---|---|---|
| JP | 3014800 U | 8/1995 |
| JP | 10-294995 A | 11/1998 |
| JP | 11-237468 A | 8/1999 |
| JP | 2000-032594 A | 1/2000 |
| JP | 2001-078296 A | 3/2001 |
| JP | 2001-326987 A | 11/2001 |
| JP | 2004-072416 A | 3/2004 |
| JP | 2005-039689 A | 2/2005 |
| JP | 2006-174003 A | 6/2006 |

OTHER PUBLICATIONS

PCT/JP2009/070425 Written Opinion Report dated May 1, 2010.
Office Action from corresponding JP application 2010-5203057 dated Jul. 6, 2010 (with english translation).

* cited by examiner

*Primary Examiner* — Thomas Dougherty
(74) *Attorney, Agent, or Firm* — Dickstein Shapiro LLP (57) ABSTRACT

An ultrasonic transducer that improves workability of a housing, suppresses variations in resonant frequency, and has stable characteristics is constructed. The ultrasonic transducer includes a bottomed circular cylindrical housing and a piezoelectric element provided at substantially a center of a bottom of the housing. The bottom of the housing has a slope portion that gradually becomes thinner from a position at which the piezoelectric element is provided toward an inner wall surface of the housing, and a flat portion that extends from an outer edge of the slope portion to the inner wall surface of the housing while maintaining a thickness of the outer edge of the slope portion.

7 Claims, 7 Drawing Sheets

ULTRASONIC TRANSDUCER

CROSS REFERENCE TO RELATED APPLICATIONS

The present application is a continuation of International Application No. PCT/JP2009/070425, filed Dec. 4, 2009, which claims priority to Japanese Patent Application No. JP2008-310321, filed Dec. 4, 2008, the entire contents of each of these applications being incorporated herein by reference in their entirety.

FIELD OF THE INVENTION

The present invention relates to ultrasonic transducers. In particular, the present invention relates to an ultrasonic transducer used as a back sonar system or a corner sonar system for a car, or used as a parking spot sensor that detects, in parallel parking, whether there is a space between a car and an obstacle, such as a side wall.

BACKGROUND OF THE INVENTION

An ultrasonic transducer uses ultrasound to perform sensing. A piezoelectric vibration element in the ultrasonic transducer intermittently transmits ultrasonic pulse signals and receives waves reflected from surrounding obstacles, and thereby detects an object.

Figure 1:
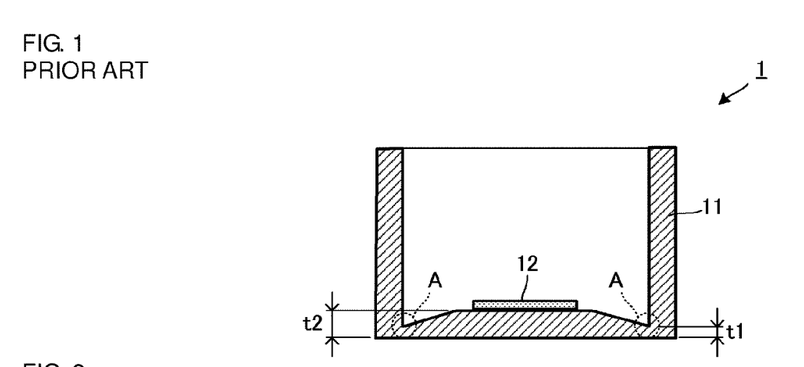
FIG. 1 is a cross-sectional view illustrating a housing structure of an ultrasonic transducer disclosed in Patent Document 1.

An ultrasonic transducer of this type is disclosed in Patent Document 1. FIG. 1 is a cross-sectional view illustrating a housing structure of an ultrasonic transducer 1 disclosed in Patent Document 1. A housing 11 of the ultrasonic transducer is a bottomed cylindrical housing that is circular in transverse section. A piezoelectric element 12 is mounted on a center of an inner surface of a bottom of the housing 11. The bottom of the housing 11 is thick at the center on which the piezoelectric element 12 is mounted, and gradually becomes thinner toward an inner wall surface of the housing 11.

Patent Document 1: Japanese Unexamined Patent Application Publication No. 2006-174003

The ultrasonic transducer disclosed in Patent Document 1 has characteristics of less reverberation and narrow directivity.

Referring to FIG. 1, a portion indicated by A (i.e., a corner between a slope portion of the bottom of the housing and a side wall) has a sharp edge in design. However, it is difficult in practice to form a sharp edge at this location.

The portion indicated by A in FIG. 1 is rounded with a curvature radius R in practice. It has been found that variations in curvature radius R cause significant variations in resonant frequency of the ultrasonic transducer, and contribute to unstable characteristics of the ultrasonic transducer.

It has also been found that the levels of amplitude and sensitivity provided by the structure of FIG. 1 are not satisfactory.

SUMMARY OF THE INVENTION

An object of the present invention is to provide an ultrasonic transducer that improves workability of a housing, suppresses variations in resonant frequency, and provides a large amplitude.

An ultrasonic transducer according to the present invention includes a bottomed circular cylindrical housing and a piezoelectric element provided at substantially a center of a bottom of the housing. The bottom of the housing has a slope portion that gradually becomes thinner from a position at which the piezoelectric element is provided toward an inner wall surface of the housing, and a flat portion that extends from an outer edge of the slope portion to the inner wall surface of the housing while maintaining a thickness of the outer edge of the slope portion. At the same time, d1/D is a value in the range of 0.1 to 0.9, where D is a radial dimension from an inner end of the slope portion to the inner wall surface of the housing and d1 is a radial dimension of the flat portion.

According to the present invention, since there is a flat portion between the slope portion of the inner bottom surface of the housing and the inner wall surface, the bottom of the housing can be shaped with high precision during manufacture of the housing. Although a boundary (or corner) between the flat portion of the bottom of the housing and the inner wall surface is rounded with a curvature radius R, a change in resonant frequency of the ultrasonic transducer associated with variations in curvature radius R is small. Therefore, the ultrasonic transducer having stable characteristics can be obtained.

DETAILED DESCRIPTION OF THE INVENTION

An ultrasonic transducer according to the present invention includes a bottomed circular cylindrical housing and a piezoelectric element provided at substantially a center of a bottom of the housing. The bottom of the housing has a slope portion that gradually becomes thinner from a position at which the piezoelectric element is provided toward an inner wall surface of the housing, and a flat portion that extends from an outer edge of the slope portion to the inner wall surface of the housing while maintaining a thickness of the outer edge of the slope portion. At the same time, d1/D is a value in the range of 0.1 to 0.9, where D is a radial dimension from an inner end of the slope portion to the inner wall surface of the housing and d1 is a radial dimension of the flat portion.

As described above, since there is a flat portion between the slope portion of the inner bottom surface of the housing and the inner wall surface, the bottom of the housing can be shaped with high precision during manufacture of the housing. Although a boundary (or corner) between the flat portion of the bottom of the housing and the inner wall surface is rounded with a curvature radius R, a change in resonant frequency of the ultrasonic transducer associated with variations in curvature radius R is small. Therefore, the ultrasonic transducer having stable characteristics can be obtained.

If d1/D is less than 0.1, the boundary between the flat portion of the bottom of the housing and the inner wall surface is easily rounded with the curvature radius R, so that it is difficult to sufficiently reduce a change in resonant frequency. If d1/D is greater than 0.9, the amplitude of an outer edge of the flat portion of the bottom of the housing (i.e., the amplitude of an end of the flat portion adjacent to the inner wall surface of the housing) is large. This causes vibrations to be easily transmitted to the inner wall surface of the housing, and causes easy occurrence of reverberation.

An ultrasonic transducer is often used as a device for assisting parking of a car. To prevent effects of reflection from the ground and curbs, there is a need for providing directivity that is narrow along one of vertical and horizontal axes and wide along the other of the vertical and horizontal axes.

To achieve this, a recess having both long and short axes may be provided inside the housing of the ultrasonic transducer.

However, when such a housing is manufactured by forging, a conventional processing method has problems as follows.

When a step portion of an inner bottom surface of the housing is formed, a flow of material is stopped at the step portion. The resulting heavy load may cause distortion of an outer bottom surface of the housing and adversely affect the appearance.

Significant variations in deformation of the outer bottom surface of the housing cause variations in directivity.

To prevent this, a conventional forging process involves cutting, after forging, to smooth the outside of the bottom surface. This makes it difficult to manufacture the housing at low cost. The cutting process results in variations in thickness of the bottom of the housing and again causes variations in directivity. Moreover, the cutting process leaves traces, which adversely affect the outer appearance. Therefore, there is a need for an ultrasonic transducer that allows a housing having a difference in directivity between the horizontal and vertical axes to be produced by forging, has less variations in characteristics, provides an excellent appearance, and can be manufactured at low cost.

Accordingly, it is preferable that an angle of inclination of the slope portion be, for example, 45 degrees or more from the normal to an upper flat portion on which the piezoelectric element is provided. Thus, when the angle of inclination of the slope portion is 45 degrees or more from the normal to a portion of the inner bottom surface of the housing on which the piezoelectric element is provided, it is possible to perform forging. This makes it possible to provide an ultrasonic transducer that has less variations in characteristics, provides an excellent appearance, and can be manufactured at low cost.

Note that the angle of inclination of the slope portion is less than 90 degrees.

It is particularly preferable that the inner wall surface of the housing have a long diameter and a short diameter (i.e., a cross section of the inner wall surface taken at a plane parallel to the bottom surface of the housing be elliptical); part of the upper flat portion on which the piezoelectric element is provided be substantially tangent to the inner wall surface; and an angle of inclination of the slope portion in a cross section of the housing, the cross section being taken along a plane orthogonal to a line tangent to a boundary (ridge) between the upper flat portion and the slope portion, be 45 degrees or more from the normal to a surface on which the piezoelectric element is provided. When the inner wall surface of the housing has a long axis and a short axis, that is, when the bottom surface or a vibrating surface of the housing is substantially elliptical or oval in shape, variations in thickness of the bottom of the housing tend to occur during forging. Although this often results in distortion of the outer bottom surface and variations in directivity, the present invention makes it possible to provide an ultrasonic transducer that has less variations in characteristics, provides an excellent appearance, and can be manufactured at low cost.

<<First Embodiment>>

An ultrasonic transducer according to a first embodiment of the present invention will be described with reference to FIG. 2 to FIG. 7.

Figure 2:
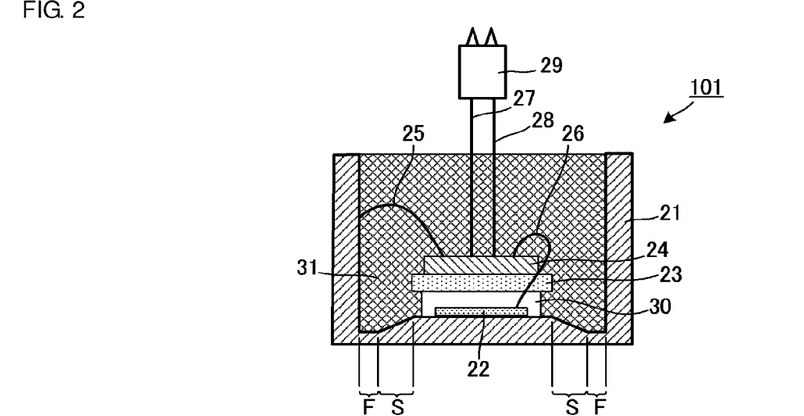
FIG. 2 is a cross-sectional view of an ultrasonic transducer 101 according to an embodiment of the present invention.

FIG. 2 is a cross-sectional view of an ultrasonic transducer 101 according to an embodiment of the present invention. The ultrasonic transducer 101 includes a bottomed circular cylindrical housing 21 and a piezoelectric element 22 provided at substantially a center of an inner bottom surface of the housing 21.

The inner bottom surface of the housing 21 has a slope portion S and a flat portion F. The slope portion S gradually becomes thinner from the position at which the piezoelectric element 22 is provided toward an inner wall surface of the housing 21. The flat portion F extends from an outer edge of the slope portion S to the inner wall surface of the housing 21 while maintaining a thickness of the outer edge of the slope portion S.

A sound-absorbing member 23 is disposed above the piezoelectric element 22 with a space 30 therebetween. A substrate 24 is disposed on the sound-absorbing member 23. An electrode on the substrate 24 is connected to the housing 21 via an inner lead 25, and another electrode on the substrate 24 is connected to an electrode of the piezoelectric element 22 via an inner lead 26. First ends of respective outer leads 27 and 28 are connected to respective connection electrodes of the substrate 24, and second ends of the respective outer leads 27 and 28 are connected to a connector 29. The outer lead 27 and the inner lead 25 are connected to each other via the substrate 24, and the outer lead 28 and the inner lead 26 are connected to each other also via the substrate 24. The inside of the housing 21, except the space 30, is filled with resin 31.

The housing 21 is an aluminum housing produced by cutting. The sound-absorbing member 23 is, for example, a disk-shaped felt of polyester fiber. The resin 31 is elastic silicon resin.

Figure 3:
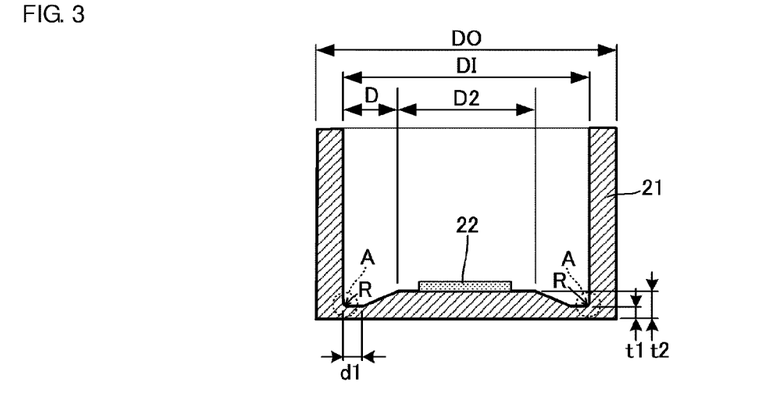
FIG. 3 shows dimensions of respective portions of a housing 21 of the ultrasonic transducer 101.

FIG. 3 shows dimensions of respective portions of the housing 21. A thickness of a portion of the bottom of the housing 21, the portion being provided with the piezoelectric element 22 thereon, is denoted by t2; a thickness of the flat portion is denoted by t1; a diameter of the portion of the bottom of the housing 21, the portion being provided with the piezoelectric element 22 thereon, is denoted by D2; an inside diameter of the housing 21 is denoted by DI; an outside diameter of the housing 21 is denoted by DO; and a curvature radius of a portion indicated by A is denoted by R. The dimensions of the respective portions of the housing 21 are as follows.

t1=1.0 mm
t2=1.5 mm
DO=14 mm
DI=11 mm
D2=8 mm
R=0.2 mm

Note that the piezoelectric element 22 is 7 mm in diameter and 0.15 mm in thickness.

A description will now be given of how, under the conditions described above, characteristics change when a radial dimension d1 of the flat portion is changed relative to a radial dimension D of a portion extending from an inner end of the slope portion to the inner wall surface of the housing.

Figure 4:
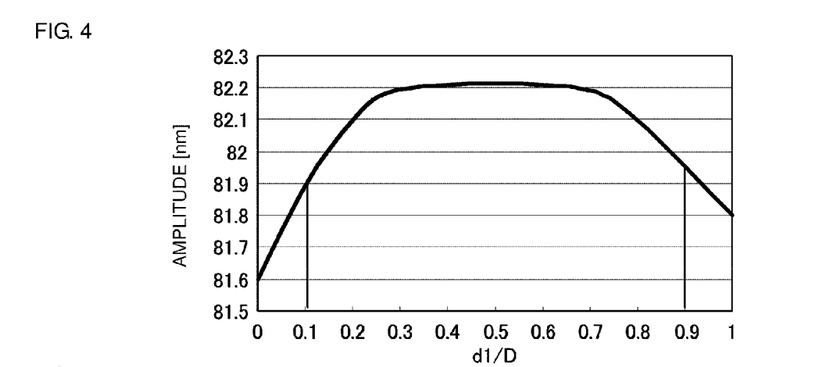
FIG. 4 is a graph showing a relationship between d1/D and an amplitude of a bottom of the housing 21.

FIG. 4 is a graph showing a relationship between d1/D and an amplitude of the bottom of the housing 21. Here, a signal for the piezoelectric element 22 is a sinusoidal signal having a voltage of 1 V and a frequency of 67 kHz. The vertical axis of FIG. 4 represents the amplitude (nm). When d1/D=0, d1 is 0, which corresponds to characteristics obtained in the case of the conventional structure. When d1/D=0, the amplitude is 81.6. However, when d1/D is in the range of 0.1 to 0.9, the amplitude exceeds 81.9 and becomes stable. When d1/D exceeds 0.9, the amplitude falls below 81.9.

Every time the amplitude changes by 0.1, the sensitivity of an ultrasonic sensor changes about by 3%. This means that the sensitivity in the invention of the present application is at least 9% higher than that in Patent Document 1, where d1/D=0. It has also been found that the sensitivity in the invention of the present application is at least 3% higher than that of a conventionally known ultrasonic sensor where d1/D=1. This shows that the amplitude is not increased simply by providing a flat portion at the bottom of the housing, particularly near the portion indicated by A in FIG. 3, but setting d1/D to a value in the range of 0.1 to 0.9 increases the amplitude and contributes to improved sensitivity.

Figure 5:
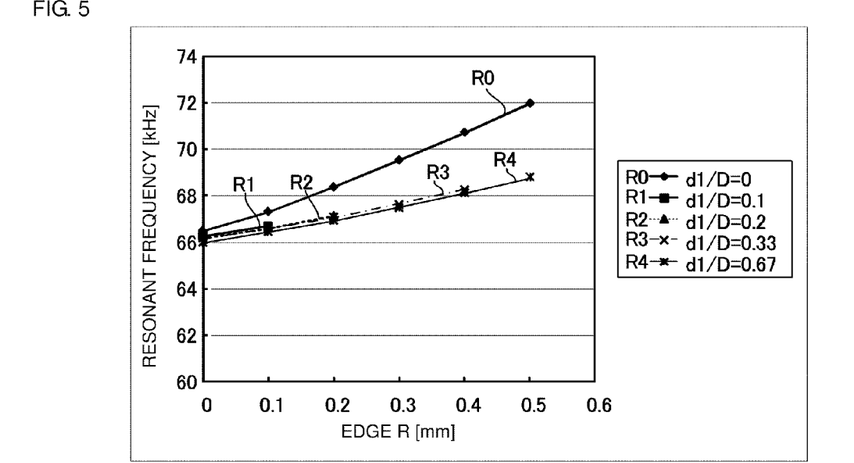
FIG. 5 is a graph showing a relationship between a curvature radius R of a portion indicated by A (i.e., a corner between a flat portion and an inner wall surface) in FIG. 3 and a resonant frequency of the ultrasonic transducer.

FIG. 5 is a graph showing, when the portion indicated by A (i.e., a corner between the flat portion and the inner wall surface) in FIG. 3 is rounded, a relationship between the curvature radius R of this portion and a resonant frequency of the ultrasonic transducer. Here, the graph shows characteristic curves R0, R1, R2, R3, and R4 representing five examples, d1/D=0, d1/D=0.1, d1/D=0.2, d1/D=0.33, and d1/D=0.67, respectively. When d1/D=0, the resonant frequency changes relatively greatly as the curvature radius R increases. When d1/D is 0.1 or more, a change in resonant frequency relative to a change in curvature radius R is small.

This shows that as compared to the ultrasonic transducer having the conventional structure illustrated in FIG. 1, variations in resonant frequency caused by errors in manufacturing the housing 21 are small.

Figure 6:
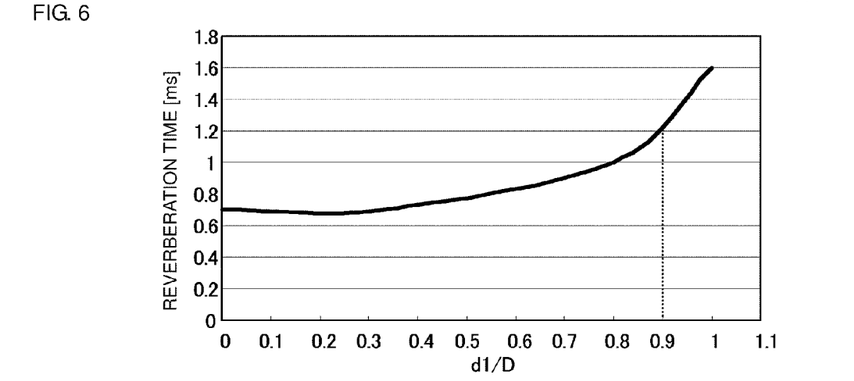
FIG. 6 is a graph showing a relationship between d1/D and reverberation time of the ultrasonic transducer.

FIG. 6 is a graph showing a relationship between d1/D and reverberation time of the ultrasonic transducer. When d1/D is in the range of 0.1 to 0.9, the reverberation time is less than 1.2 ms, which is a reverberation characteristic sufficient for car-mounted ultrasonic sensors. That is, with the structure having the slope portion S at the bottom of the housing 21 illustrated in FIG. 2 and FIG. 3, a short reverberation time characteristic can be maintained.

Figure 7A:
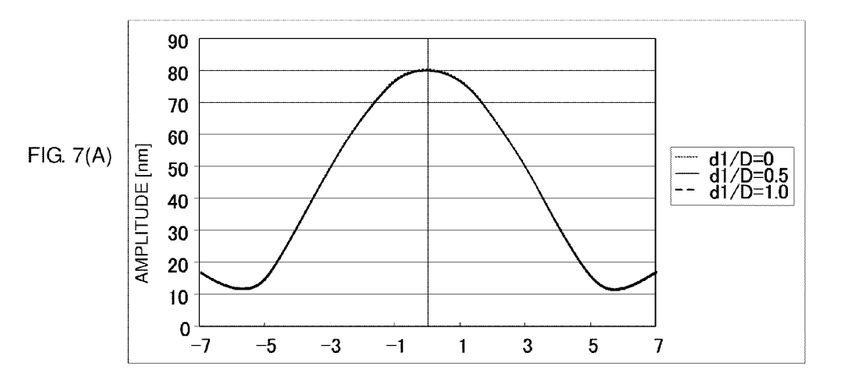
FIG. 7(A) shows a distribution of vibrations of the bottom of the housing 21 of the ultrasonic transducer 101 illustrated in FIG. 2.
Figure 7B:
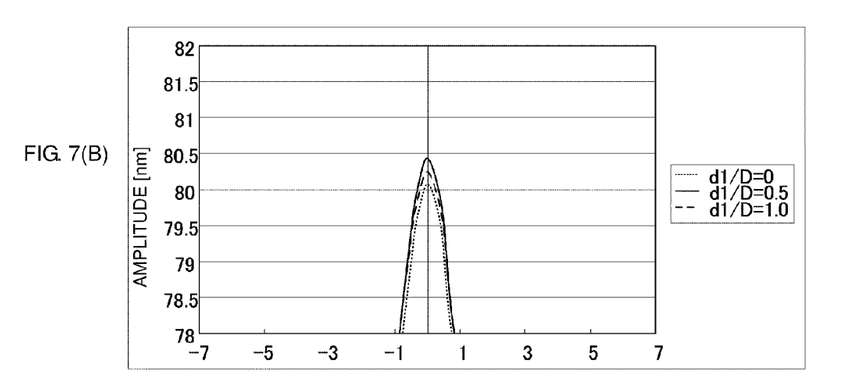
FIG. 7(B) shows characteristics of a center portion in a state where the scale of the vertical axis of FIG. 7(A) is expanded.
Figure 7C:
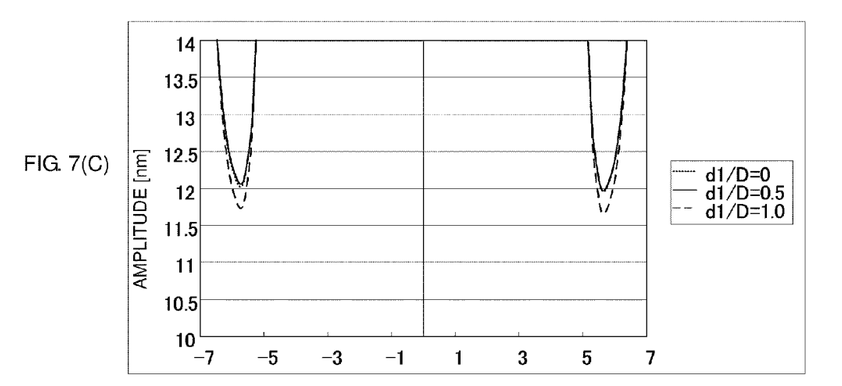
FIG. 7(C) shows characteristics of both sides in a state where the scale of the vertical axis of FIG. 7(A) is expanded.

FIG. 7(A) shows a distribution of vibrations of the bottom of the housing 21 of the ultrasonic transducer 101 illustrated in FIG. 2. The horizontal axis represents a distance (mm) from the center and the vertical axis represents the amplitude (nm). FIG. 7(B) shows characteristics of a center portion in a state where the scale of the vertical axis of FIG. 7(A) is expanded. FIG. 7(C) shows characteristics of both sides in a state where the scale of the vertical axis of FIG. 7(A) is expanded.

A characteristic obtained when d1/D=0.5 is a representative characteristic for d1/D in the range of 0.1 to 0.9. When d1/D=1, the amplitude of the flat portion is small on both sides. This is presumably because radial vibrations of the piezoelectric element 22 are not well transmitted to the flat portion.

When d1/D=0 (no flat portion), the amplitude on both sides is the same as that obtained when d1/D=0.5, but the amplitude at the center portion only is small. This is presumably because the bottom of the housing 21 is too stiff to easily vibrate.

Therefore, by setting d1/D to any value in the range of 0.1 to 0.9, it is possible to increase the amplitude of the bottom of the housing 21 and achieve high sensitivity as an ultrasonic sensor.

<<Second Embodiment>>

An ultrasonic transducer according to a second embodiment of the present invention will now be described with reference to FIG. 8(A) to FIG. 13.

The second embodiment relates to an ultrasonic transducer having a directivity in which the widths of beams orthogonal to each other in a plane are different. In the second embodiment, a housing of the ultrasonic transducer is produced by forging.

Figure 8A:
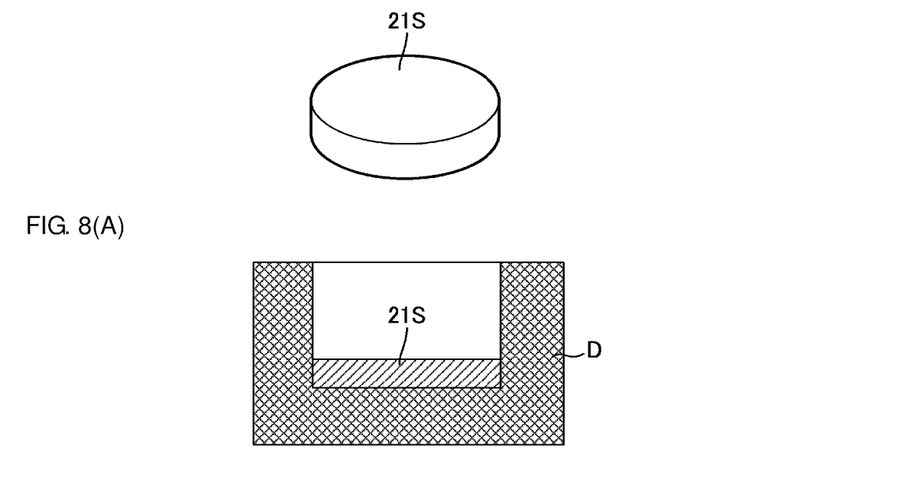
FIG. 8(A) illustrates a workpiece 21S and a die (lower die) D used when a housing of an ultrasonic transducer is produced by die forging.

FIG. 8(A) illustrates a workpiece 21S and a die (lower die) D used when a housing of an ultrasonic transducer is produced by forging (die forging). The lower part of FIG. 8(A) illustrates a state in which the workpiece 21S is placed inside the die D. The workpiece 21S is, for example, a disk-shaped aluminum plate.

Figure 8B:
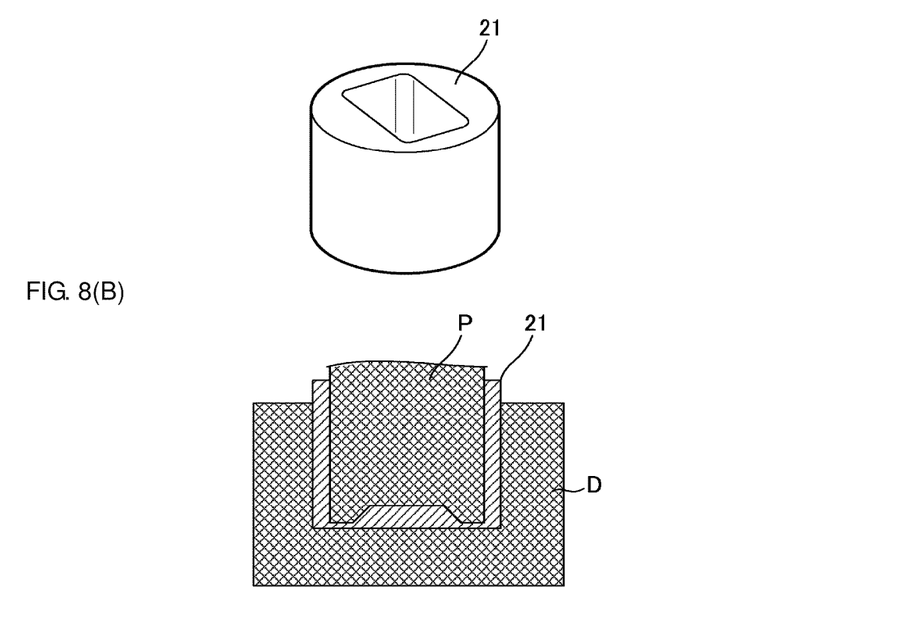
FIG. 8(B) illustrates a process of die forging and the resulting housing 21 of the ultrasonic transducer.

The lower part of FIG. 8(B) illustrates a state in which a punch (upper die) P is struck with an air hammer from over the die D illustrated in FIG. 8(B). As illustrated in the upper part of FIG. 8(B), the resulting workpiece taken out of the die is a housing 21 of the ultrasonic transducer.

An end surface of the punch P is processed in advance such that an inner bottom surface of the housing 21 is formed into a predetermined shape.

Figures 9A, 9B:
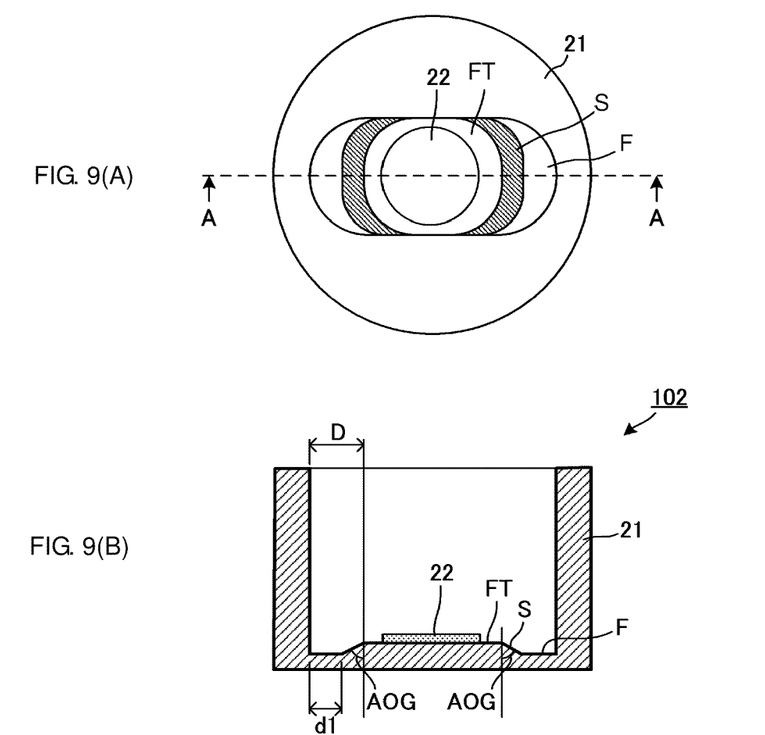
FIG. 9(A) is a plan view as viewed from an opening plane of the housing 21 of an ultrasonic transducer.
FIG. 9(B) is a cross-sectional view taken along line A-A of FIG. 9(A).

FIG. 9(A) is a plan view as viewed from an opening plane of the housing 21 of the ultrasonic transducer. FIG. 9(B) is a cross-sectional view taken along line A-A of FIG. 9(A). An ultrasonic transducer 102 includes the bottomed circular cylindrical housing 21 and a piezoelectric element 22 provided at substantially a center of the inner bottom surface of the housing 21. In FIG. 9(A) and FIG. 9(B), the illustration of a sound-absorbing member, a space, and leads provided inside the housing 21 is omitted.

The inner bottom surface of the housing 21 has a slope portion S and a flat portion F. The slope portion S gradually becomes thinner from an upper flat portion FT on which the piezoelectric element 22 is provided toward an inner wall surface of the housing 21. The flat portion F extends from an outer edge of the slope portion S to the inner wall surface of the housing 21 while maintaining a thickness of the outer edge of the slope portion S.

As in the case of the ultrasonic transducer according to the first embodiment, when a radial dimension from an inner end of the slope portion S to the inner wall surface of the housing 21 is denoted by D and a radial dimension of the flat portion F is denoted by d1, d1/D is a value in the range of 0.1 to 0.9.

In the ultrasonic transducer 102 according to the second embodiment, an angle of inclination AOG of the slope portion S is 45 degrees or more from the normal to the upper flat portion FT on which the piezoelectric element 22 is provided. If the inner bottom surface of the housing 21 has a concentric shape, the angle of inclination AOG can be an angle of inclination in a cross section taken along a plane passing through the central axis. However, in the ultrasonic transducer 102, the inner bottom surface of the housing 21 does not have a concentric shape. The angle of inclination AOG is an angle of inclination in a cross section of the housing 21 taken along a plane orthogonal to a line tangent to a boundary (ridge) between the upper flat portion FT and the slope portion S.

Figure 10:
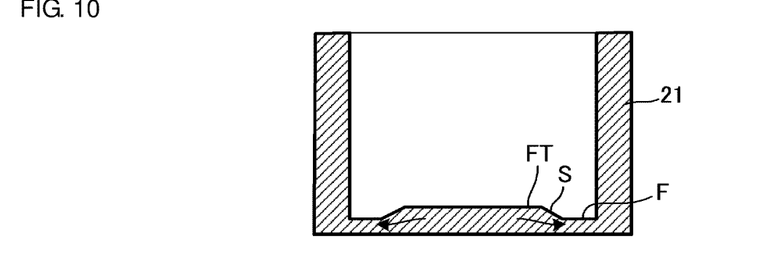
FIG. 10 is a cross-sectional view schematically illustrating a flow of material during deformation of a workpiece in the process of die forging illustrated in the lower part of FIG. 8(A).

FIG. 10 is a cross-sectional view schematically illustrating a flow of material during deformation of the workpiece in the process of die forging illustrated in FIG. 8(B). As illustrated in FIG. 8(A) and FIG. 8(B), during deformation of the workpiece for producing the housing 21 between the die D and the punch P, the material of the workpiece 21S extends outwardly from the center of the inner bottom surface of the housing 21, as indicated by arrows in FIG. 10. By forming the shape of the inner bottom surface of the housing 21 as described above, the material flows smoothly from the upper flat portion FT to the slope portion S and the flat portion F. This can reduce the occurrence of distortion at the boundary between the slope portion S and the flat portion F, and can make it possible to prevent the flat appearance of the outer bottom surface of the housing 21 from being adversely affected.

Figure 11A:
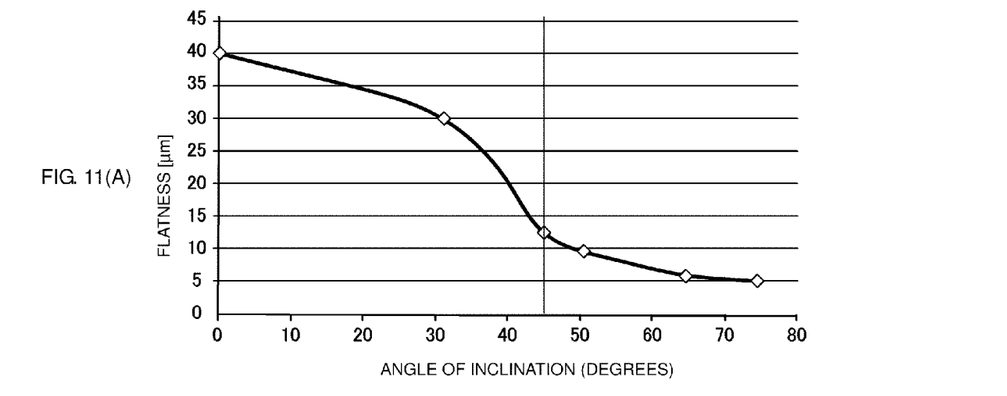
FIG. 11(A) is a graph showing a relationship between an angle of inclination AOG and the flatness of an outer bottom surface of the housing 21.
Figure 11B:
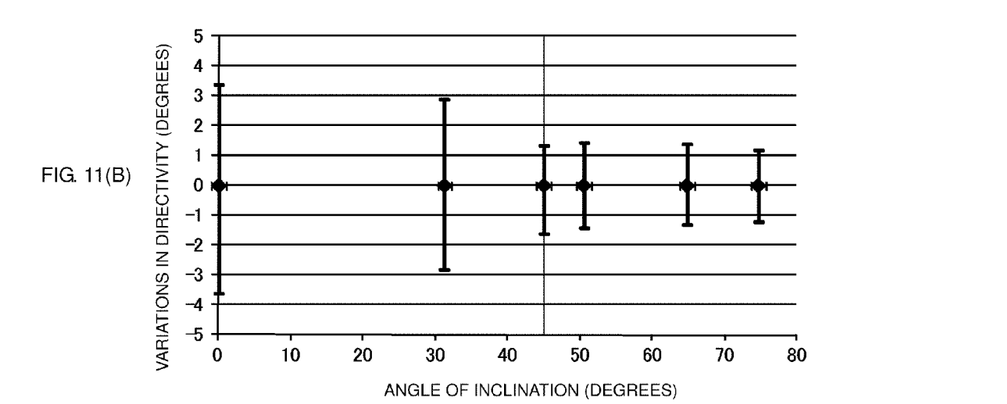
FIG. 11(B) shows the angle of inclination AOG and variations in directivity of the outer bottom surface of the housing 21 calculated for each of samples.

FIG. 11(A) is a graph showing a relationship between the angle of inclination AOG and the flatness of the outer bottom surface of the housing 21. Here, the average flatness of five samples is calculated. FIG. 11(B) shows the angle of inclination AOG and variations in directivity of the outer bottom surface of the housing 21 calculated for the samples described above.

Figure 12:
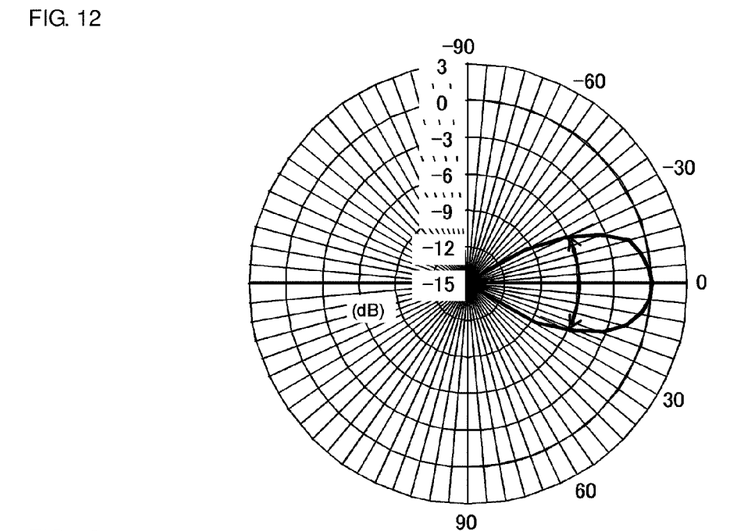
FIG. 12 illustrates directivity of an ultrasonic transducer 102 according to a second embodiment of the present invention.
Figure 13:
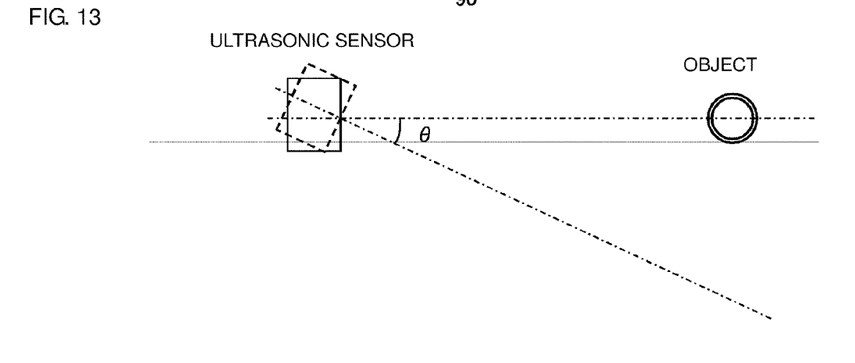
FIG. 13 illustrates a positional relationship between an ultrasonic sensor and an object during measurement of directivity.

FIG. 12 illustrates the directivity shown in FIG. 11(B). FIG. 13 illustrates a positional relationship between an ultrasonic sensor and an object during measurement of directivity, a relationship between an angle θ of the sensor relative to the object and an attenuation of voltage output by the sensor when the sensor receives acoustic waves reflected by the object after transmitted from the sensor, according as the angle θ is gradually changed. Specifically, variations in angle θ corresponding to an attenuation of −6 dB are shown.

As is apparent from FIG. 11(A), when the angle of inclination AOG is 45 degrees or more, the flatness of the outer bottom surface of the housing 21 is 15 μm or less and thus, a good outer appearance can be achieved. When the angle of inclination AOG is 50 degrees or more, the flatness is 10 μm or less, which is more preferable. As is apparent from FIG. 11(B), when the angle of inclination AOG is 45 degrees or more, variations in the directivity described above can be ±1.5 μm or less and thus, a high-precision housing can be obtained.

The housing 21 having the inner bottom surface which does not have a concentric shape is used in the second embodiment. However, it is obvious that the present invention can be adopted even when the inner bottom surface of the housing 21 has a concentric shape.

<<Other Embodiments>>

Aluminum is used as a material of the workpiece 21S in the second embodiment described above. However, as a material suitable for forging, an alloy obtained by selectively adding one or more of Mg, Si, Mn, Fe, and Zn to aluminum may be used. Alternatively, Mg or an alloy obtained by adding Al and/or Zn to Mg may be used.

Examples of possible forging techniques include a method in which a disk-shaped workpiece is processed in a die in a single forging process, and a method in which a disk-shaped workpiece is forged multiple times while being conveyed.

REFERENCE NUMBERS 101, 102: ultrasonic transducers
11: housing
12: piezoelectric element
21: housing
22: piezoelectric element
23: sound-absorbing member
24: substrate
25, 26: inner leads
27, 28: outer leads
29: connector
30: space
31: resin
F: flat portion
FT: upper flat portion
S: slope portion
D: die
P: punch

The invention claimed is:

1. An ultrasonic transducer comprising:
a housing having a bottom and a wall extending upwardly from the bottom; and
a piezoelectric element provided at substantially a center of the bottom of the housing,
wherein the bottom of the housing has a slope portion that gradually becomes thinner from a position at which the piezoelectric element is provided toward an inner surface of the wall of the housing, and a flat portion that extends from an outer edge of the slope portion to the inner surface of the wall of the housing while maintaining a thickness of the outer edge of the slope portion, and
d1/D is a value in the range of 0.1 to 0.9, where D is a radial dimension from an inner end of the slope portion to the inner surface of the wall of the housing and d1 is a radial dimension of the flat portion.

2. The ultrasonic transducer according to claim 1, wherein the housing is a circular cylindrical housing.

3. The ultrasonic transducer according to claim 1, wherein an angle of inclination of the slope portion is 45 degrees or more with respect to a normal line of a portion of the bottom of the housing on which the piezoelectric element is provided.

4. The ultrasonic transducer according to claim 3, wherein the portion of the bottom of the housing on which the piezoelectric element is provided is flat.

5. The ultrasonic transducer according to claim 3, wherein the inner surface of the wall of the housing has a long diameter and a short diameter, and a portion of the portion on which the piezoelectric element is provided substantially contacts the inner surface; and the angle of inclination of the slope portion is in a cross section of the housing, the cross section being taken along a plane orthogonal to a line tangent to a boundary between the portion and the slope portion, is 45 degrees or more with respect to the normal line of a surface on which the piezoelectric element is provided.

6. The ultrasonic transducer according to claim 5, wherein the angle of inclination is 50 degrees or more.

7. The ultrasonic transducer according to claim 1, wherein the angle of inclination is 50 degrees or more.

* * * * *